Patented July 20, 1937

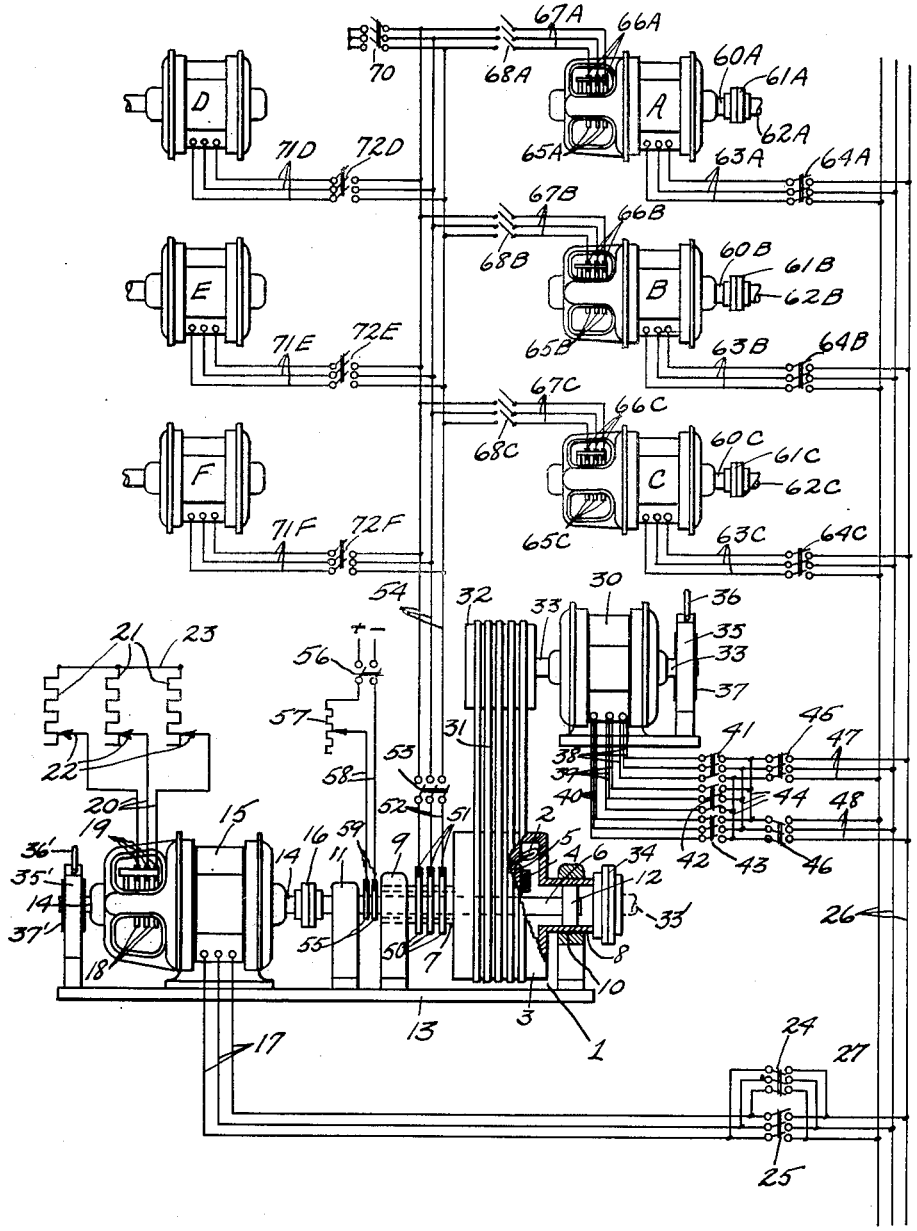

2,087,782

UNITED STATES PATENT OFFICE 2,087,782

ADJUSTABLE SPEED CONTROL

Allen M. Rossman, Wilmette, Ill., assignor to Rossman Engineering Company, Chicago, Ill., a corporation of Illinois Application November 3, 1934, Serial No. 751,276
Renewed January 5, 1937

14 Claims. (Cl. 172—293)

The present invention relates to adjustable speed control for alternating current motors, and in particular to a system for controlling in unison the speeds of a number of motors connected to inter-related load shafts, such as paper mill machines, conveyors, and the like. In this type of application, it is frequently necessary, as in paper mill machines, to maintain an actual or a practically synchronous speed relation between the several shafts, not only during normal operation but also during starting and stopping.

In the past, the most common method of controlling in unison the speeds of a number of shafts was to connect them together by belting and line shafts and drive them by a single adjustable speed motor. This method has the disadvantage of belt slipping which varies with the loads on the various pulleys, and results in non-uniform speeds. Furthermore, a maze of shafting and belting constitutes a hazard and is unsightly and consequently the trend in most modern plants is away from the group drive toward individual drives.

In the latter class, direct current motors supplied by a common generator is one of the well-known systems. Speed control is obtained by adjusting the voltage impressed on the motors by regulating the generator field. Although this method provides control of the motors in unison, it does not insure that they are always in synchronism, except as their characteristics can be made exactly alike, which is very difficult if not impossible to attain. Therefore, this system is usually supplemented by individual control of the fields of the various motors so that corrections of their individual speeds can be made during operation. When perfect synchronism is required, a small synchronous machine is coupled to each of the direct current motors, the windings of all synchronous machines being connected in multiple, thereby holding all motors in synchronism. It is evident, however, that in most cases the cost of such a system would be prohibitive. Furthermore, the cost of maintenance is comparatively high because of the large number of commutators and brushes to be kept in order.

To avoid the high cost of direct current motors, alternating current motors have been used, power being supplied by a common generator. Speed variation is obtained by regulation of the frequency of the alternating current energy supplied to the motors. This method requires an adjustable speed drive for the generator such as a steam turbine or a direct current motor. A supply of steam is not always convenient, however, and turbines are inefficient at lower speeds, while a direct current motor requires rectifying equipment to convert to direct current the alternating current which is generally supplied by public utilities. This double conversion from alternating current to direct current and back to alternating current not only requires expensive equipment but entails comparatively high losses.

Furthermore, when motors are controlled by adjusting the frequency of A. C. power supplied to them, there are certain inherent difficulties encountered such as in starting, because the torque developed by the motors is low at very low frequencies. Consequently, in applications requiring high starting torque; e. g. conveyors and the like, it is necessary to start the motors on at least 25% to 50% frequency. This requires a synchronous operation of the motors during starting which disturbs the angular relation between the various motors in those cases in which perfect synchronous operation is necessary.

In the present invention, to obtain full torque as well as to maintain synchronous relation between the motors during starting, wound rotor type induction motors are used. The primary windings of the motors are connected to a common supply of A. C. energy, while the secondary windings are connected to a common bus which is connected to a synchronous machine which controls the frequency in the secondary windings of the motors. To start the motors, the frequency of the voltage on the secondary windings is made equal to that of the primary supply; then, by reducing the secondary frequency, the motors are accelerated in perfect synchronism and with full torque.

In my copending application, Serial No. 597,144, filed March 7, 1932, I have disclosed a system for controlling the secondary frequency of the motors. In this disclosure, the adjustable frequency machine consists of a synchronous machine having a rotatable field member, as well as a rotatable armature member, both the rotor and frame being mounted on bearings for independent rotation. One of the members is driven at a constant speed by a constant speed alternating current machine, while the other member is driven at adjustable speeds by a direct current machine. The latter is controlled by armature voltage control by a generator which is also driven by the constant speed machine. By this arrangement, the adjustable speed member can be controlled over two ranges, one in either direction, thereby adding the speed of the adjustable speed member to or subtracting it from the constant speed of the other member of the synchronous machine, giving corresponding changes in frequency. The advantage of such an arrangement for obtaining control over a double range is that the horse power capacity of the control machines is half of that which would be required to obtain the same results with a single range of control.

The system disclosed in the present invention was developed to meet the need for a simple, practical and economical method of controlling a number of conveyors in unison while maintaining a fixed ratio between their speeds. A demand for such a system of control is found in the packing house industry for use in the slaughter house.

In this process, each carcass is placed on a moving conveyor which carries it through a line of progressive operations. First, the head is removed and placed on a second conveyor; then the viscera are removed and placed on a third conveyor. These conveyors then branch out to the various operations in the process of preparation of the meat.

Now each part of the animal is subjected at several stages in the process, to governmental inspection. If any part of the animal is found to be diseased and rejected at any step in the process, it then frequently is necessary to remove each of the other parts of that animal from the process lines.

It has therefore become the practice to operate the several conveyors at speeds bearing a fixed ratio to one another, so that the location of each part of an animal in its respective process line bears a fixed relation to the other parts of that animal, making it easy to remove from the process all parts of a rejected animal.

At times to maintain operations at reduced rates it is necessary to decrease the speed of all conveyors, but keeping the speeds of the several conveyors in the same fixed ratio.

In present practice, the conveyors are driven by a system of line shafts driven from a common motor. It has been a problem in the packing industry to modernize their plants with individual drive, thereby eliminating the hazards of shafts and belting, and still maintain the fixed speed ratio between conveyors by simple practical means.

Although the system of control disclosed in my aforementioned copending application provides the necessary characteristics, it provides more refinements in the number of economical operating speeds available, etc. than are necessary in this service; therefore, one of the objects of the present invention is to provide a simpler and less costly system of control but which meets the requirements of the above described service.

The general object of the present invention is to improve and simplify the system disclosed in the above mentioned copending application.

One specific object is to provide a system of adjustable speed control of a plurality of motors in unison while maintaining a fixed ratio between the speeds thereof, without the use of commutating machines.

A further object relates to the provision of a number of economical running speeds with means for accelerating the motors from one to another smoothly and without shock.

Other objects will be made apparent to those skilled in the art by the following description.

In the present invention, the adjustable frequency machine has a rotatable frame member as well as a rotatable rotor member, each of the members being driven or controlled by a variable speed alternating current machine, one being driven by a multi-speed induction motor and the other by a wound rotor type induction motor provided with adjustable resistance in its secondary circuit. A large number of relative speeds between frame and rotor members is available by different combinations of speeds on the two auxiliary machines, as will be made clear in the following description, with the aid of the single sheet of drawings accompanying this specification, on which the single figure is a diagram of the arrangement of the several machines together with the electrical connections.

The key machine of this system is the adjustable frequency machine 1 which is preferably a synchronous machine, having an armature winding 2 on the frame member 3 which corresponds to the stator in a conventional machine. A portion of the frame has been shown cut away to show the windings. Besides the armature winding 2, the machine has a field winding 4 on the salient field poles 5 which are mounted on the shaft 6.

Although the adjustable frequency machine in the preferred embodiment is of the synchronous type, an induction type machine can be used. As its magnetizing current must be supplied through the load driving motors and as its reactance is added to the reactances of the latter motors, the torques of the series connected machines will be greatly reduced and the power factor of the system will be poor.

The frame or armature member 3 is supported on a pair of hollow shafts 7, 8 which are carried on pedestal bearings 9, 10, thereby permitting the frame member to rotate freely and independent of the rotor or field member which comprises the field poles 5, windings 4, and shaft 6.

The rotor shaft 6 extends through and is coaxial with the hollow shafts 7, 8, and is supported on two bearings 11, 12. On one end of the machine the rotor shaft bearing 11 is of the pedestal type, independent of the corresponding frame shaft bearing 9. The bearing 12 on the other end of the machine is shown diagrammatically in a different arrangement. It is preferably of the roller or ball bearing type and is carried by and bears within the hollow shaft 8. These two bearing arrangements are shown merely by way of illustration as the two ends of the machine need not have bearings of different types.

The pedestals 9, 10, 11 are mounted on a base 13.

One of the rotatable members of the synchronous machine 1, in this embodiment, the rotor shaft 6, is connected or coupled to the shaft 14 of a wound rotor type induction motor 15 by means of a coupling 16. This auxiliary motor has a primary winding to which are connected the primary leads 17. The secondary or rotor winding is connected to the collector rings 18 upon which bear brushes 19, which are connected to the secondary leads 20. Secondary resistors 21 are connected in series with the secondary leads 20 through movable contacts 22 which are adapted for inserting more or less of the secondary resistors in series with the secondary winding. At the extreme end of the travel of the contacts 22, the resistors are out of the circuit entirely and the secondary leads 20 are short circuited by the connecting wire 23.

The auxiliary wound rotor induction motor 15 is connected for forward or reverse operation by means of a pair of reversing switches 24, 25 which connect the motor to the alternating current supply bus 26. One switch 25 connects the leads direct to the bus 26 while the other 24 connects them in reverse order by means of connecting leads 27.

The other rotatable member 3 of the synchronous machine 1 is connected to a second auxiliary machine 30 by means of multiple V-belts 31 which engage the frame 3 and a pulley 32 which is fixed to the shaft 33 of the motor 30. Instead of a belt connection between the motor 30 and the frame member 3, they may be directly coupled by means of a coupling 34 on the end of the hollow shaft 8 extended through the bearing 10. The motor 30 would then be in line with the axis of the synchronous machine 1, the shaft of the motor 30 being located as shown in broken lines 33'.

A brake 35, operable by a handle 36 is adapted to engage a drum 37 fixed to an extension of the motor shaft 33. A similar brake 35' is adapted to engage a drum 37' fixed to the shaft 14 of the auxiliary wound rotor induction motor 15.

This auxiliary motor 30 is a multi-speed squirrel cage induction motor having in this illustration three windings, each winding having a different number of poles, therefore adapting the motor for operation at three different fixed speeds. The windings are connected to three sets of terminal leads respectively 38, 39, 40. These leads are connected respectively to speed selecting switches 41, 42, 43.

By means of these switches the leads can be selectively connected to a common bus 44 which is in turn connected to the power supply bus 26 by means of a pair of reversing switches 45, 46. These switches are connected to the bus 26 by two sets of leads respectively 47, 48 in opposite phase rotation. Hence, in the embodiment shown, the motor 30 can be run at three different fixed speeds by connecting one of the windings to the bus 44 by its respective speed selecting switch, in either direction of rotation as selected by the reversing switches.

Although the drawing and description is based on a three-winding, three-speed motor for simplicity, in practice the multiple speeds can be obtained by well-known methods of reconnecting windings to give two speeds on each winding. Hence, three or even four speeds can be obtained by suitably connecting two motor windings.

The armature winding 2 of the synchronous machine 1 is connected to a set of collector rings 50, which are supported in insulated relation on the hollow shaft 7. Contact is made with these rings by brushes 51 connected to a switch 53 by leads 52. By means of this switch therefore, the armature winding 2 can be connected to the bus 54.

The terminals of the field winding 4 are connected to a pair of collector rings 55, which are fixed to the rotor shaft 6 in insulated relation and disposed between the rotor and frame shaft bearings 9, 11. Direct current for exciting the field winding is obtained from any suitable D. C. source, connected to the field winding 4 through a switch 56, an adjustable rheostat 57, leads 58, and brushes 59 which make contact with the terminal collector rings 55.

Three wound rotor induction motors A, B, C are shown in this illustration, each having a shaft 60A, 60B, 60C connected by respective couplings 61A, 61B, 61C to load shafts 62A, 62B, 62C. The loads (not shown) can be any inter-related loads adapted for control in unison and in synchronous relation.

The motors each have a primary winding connected to terminal leads 63 which can be connected to the supply bus 26 by a switch 64.

Each motor also has a secondary winding connected to terminal collector rings 65. The rings are in contact with collector brushes 66 which are connected to the adjustable frequency bus 54 by means of secondary leads 67, and secondary switches 68.

I will now explain the method of starting and operating the system described above. In order to more clearly bring out the relations between the various elements, a concrete example will be employed in the explanation based on a 60-cycle power supply.

Assume a four pole synchronous machine 1, the rotor of which is coupled to a 12-pole auxiliary wound rotor induction motor 15, and the frame 3 being connected to an induction motor 30 having three speeds: 1800, 1200 and 600 R. P. M. The belt connection 31 has a ratio of 4/1; therefore, the frame runs at 450, 300 and 150 R. P. M. respectively, corresponding to the above motor speeds.

To start, the primary and secondary switches 64, 68, the armature winding switch 53, the 1800 R. P. M. winding selective switch 41, the "reverse" rotation switch 46 of the multi-speed motor 30, and the "forward" rotation switch 25 of the wound rotor motor 15 are all closed, while a high value of resistance is inserted in the secondary of the wound rotor motor 15, or the secondary can be left open circuited. This causes power to flow into the primary windings of the load driving motors A, B, C, where it is transformed to the secondary windings and flows into the bus 54 at a frequency of 60 cycles per second at the instant of starting. The power flows from this bus 54 into the armature 2 of the synchronous motor 1, which causes this motor to accelerate to a relative speed between rotor and frame of 1800 R. P. M. This acceleration is aided by the auxiliary multi-speed motor 30 which accelerates the frame 3 to a speed of —450 R. P. M. Therefore, when the synchronous motor has reached a speed of 1800 R. P. M., the frame is running at —450 R. P. M. and the rotor at +1350 R. P. M., which is, of course, also the speed of the auxiliary motor 15. The latter motor is now running at 225% rated speed and as the resistance in its secondary circuit is set at a very high value or open circuited altogether, it exerts very little torque, consequently the machines are running without load and the load driving motors A, B, C are assumed to be stationary as yet, as the starting torque of the load is assumed to be high. However, whether or not the load shafts begin to turn at this point is not of great importance.

The resistance 21 is then gradually cut out of the secondary circuit of the auxiliary motor 15, which runs as a generator, returning power to the bus 26. This decelerates the motor 15 down to 600 R. P. M. plus slip. As the torque of the synchronous motor 1 is exerted equally against both rotor and frame, the multi-speed motor 30 is also made to generate into the bus 26, holding its speed of 1800 R. P. M. plus slip.

The maximum, or pull-out torque of the load driving motors is available to start the loads because the slip between the primary and secondary magnetic fields never needs to exceed that which corresponds to maximum torque. That is to say, after the switches have been closed and the auxiliary machines 15, 30 have been brought up to speed, the secondary frequency of the load driving motors is substantially equal to the primary frequency; therefore there is no torque. However, by closing the secondary circuit of the auxiliary wound rotor machine 15 through resistors 21, the latter machine is decelerated, causing that rotatable member of the synchronous motor 1, to which it is connected, to decelerate also, thereby reducing the frequency of the current in the secondary windings of the load driving motors. Hence, by controlling the value of resistance in the secondary resistors 21, the secondary frequency of the load driving motors can be held so as to obtain that value of slip which corresponds to maximum torque. This is possible not only during starting but during any change in speed.

The synchronous motor 1 and its auxiliary machines 15, 30 carry loads which are proportional to the difference between the operating speed and the rated speed of the load driving motors because these control machines handle only the energy in the secondary circuit of the load driving motors. At starting, the control machines must therefore momentarily handle power equal to the sum of the outputs of the motors. However, where starting occurs but infrequently, the control machines need be designed for carrying the full loads of the motors only for short, infrequent intervals; consequently the rating of the control set can be lower than that of the load driving motors.

With the secondary leads 20 of the auxiliary motor 15 finally short-circuited, the relative speed between rotor and frame of the synchronous machine is 450+600 or 1050 R. P. M., neglecting slip. The frequency of the energy flowing into the armature winding has therefore been brought down to 35 cycles and the load driving motors have consequently been accelerated to 25/60 of their synchronous speeds. As their primary windings and secondary windings are always in multiple, respectively, they necessarily start and operate in perfect synchronism with each other; that is, their rotors not only run at the same speed but are always in the same angular relation with each other, as is well known to those skilled in the art.

To bring the system to its next higher speed, the secondary resistance 21 is cut into the secondary circuit and the multi-speed auxiliary motor 30 is connected on its 1200 R. P. M. winding by opening the 1800 R. P. M. winding switch 41 and closing the 1200 R. P. M. winding switch 42. The multi-speed motor 30 decelerates to 1200 R. P. M. plus slip carrying the rotatable frame 3 to a speed of approximately 300 R. P. M., while the wound rotor motor 15 is accelerated to approximately 1050-300 or 750 R. P. M., assuming that the proper value of secondary resistance is chosen so that the torque exerted by the motors A, B, C against the load is not changed, consequently the speed of the load remains constant and the frequency of the energy in the armature winding 2 of the synchronous motor remains constant. Hence, the purpose of the resistor 21 is to cushion the shock caused by changing the multi-speed motor from one speed to another, which shock would otherwise be transmitted to the load shafts if the secondary winding of the induction motor 15 were short-circuited at the time of switching. With the resistor in the circuit, the shock is absorbed by the wound rotor induction motor 15 which yields to the shock by increasing its speed, the excess power generated by the sudden increase in speed being dissipated in the resistors.

By cutting resistance out of the rheostat 21, the speed of the wound rotor motor 15 is then decelerated to 600 R. P. M. plus slip and the speed of the synchronous motor then becomes 300+600 or 900 R. P. M. neglecting slip. This brings the frequency of the energy on the bus 54 to 30 cycles, causing the load driving motors A, B, C to run at half their synchronous speed. Hence, the latter motors have changed their speeds from 25/60 to 30/60 of their synchronous speeds, an increment of 8⅓% between economical running speeds.

By the term "economical running speed" I refer to the speeds at which there is no secondary resistance 21 in circuit; therefore, the only losses in the system are the inherent losses in the several machines. That is to say, the torque of the load driving motors A, B, C being constant at all speeds, the power input to their primary windings is constant at all speeds, the power in excess of that applied to the load shafts being regenerated by the induction motors 15, 30 and put back into the supply bus 26.

The operation of the system is not however confined to the economical running speeds. By cutting out only part of the secondary resistance, the load shafts 60 can be made to run at any desired speed between the economical speeds, while a small amount of power will then be dissipated in heat losses in the secondary resistors 21. For instance, with eight steps in the control of the resistors, increments of approximately 1% of the synchronous speeds of the load driving motors can then be obtained.

In the same manner as that outlined above, the next economical speed can be attained by inserting the resistance 21 in the secondary circuit of the auxiliary motor 15, opening the 1200 R. P. M. speed switch 42 of the multi-speed motor 30, and closing the 600 R. P. M. switch 43. The latter motor will then decelerate to 600 R. P. M. causing the frame 3 to decelerate to 150 R. P. M. and the wound rotor motor to accelerate to 750 R. P. M. By cutting out the resistance 21, the latter motor will then decelerate to 600 R. P. M. once more. The speed of the synchronous motor is now 150+600 or 750 R. P. M. and the frequency of the energy in its armature is therefore 25 cycles, bringing the speeds of the load driving motors A, B, C to 35/60 of their synchronous speeds.

The next step requires a speed of the synchronous motor 1 of 600 R. P. M. which can be obtained by the same procedure as before except that instead of connecting the multi-speed motor 30 on another winding, it is disconnected entirely and the brake 35 is applied to hold it stationary. The synchronous motor frame 3 is then stationary, while the rotor shaft 6 runs at 600 R. P. M. under control of the wound rotor motor 15. The frequency is now 20 cycles, consequently the load driving motors operate at ⅔ synchronous speed.

On the next step, the brake is released and the multi-speed motor 30 is again connected on its lowest speed winding but this time in the opposite direction by closing the "forward" switch 45. The rotatable frame is now running at +150 R. P. M.; that is, in the same direction of rotation as the rotor is turning.

With suitable resistance in the secondary circuit of the wound rotor motor 15, the latter is accelerated to 750 R. P. M., the difference between the frame and rotor speeds being 600 R. P. M. This connection can be substituted for the one previously described in which a brake 35 was necessary to obtain 600 R. P. M., the brake then being eliminated at the expense of a certain amount of resistance loss on this step.

To accelerate the load, the resistance is now gradually cut out until the wound rotor machine 15 runs at 600 R. P. M. once more, the relative speed of the frame and rotor of the synchronous machine being 450 R. P. M. neglecting slip. This corresponds to a frequency of 15 cycles, resulting in a load speed of 45/60 or ¾ of the synchronous speeds of the driving motors A, B, C.

On the next economical speed, the frame 3 runs at 300 R. P. M. in the same direction of rotation as the rotor; therefore the relative speed is 300 R. P. M., fixing the frequency at 10 cycles, the load speed being 50/60 of the synchronous speed of the driving motors.

On the last step, the relative speed of the synchronous motor is 150 R. P. M., corresponding to a frequency of 5 cycles. As the synchronizing torque between the load driving motors A, B, C is low at low secondary frequencies, it may be advisable to operate with at least 10 cycles in the secondary bus 54 if the load driving motors must remain in synchronism with each other.

In cases wherein the synchronous relation can be dispensed with, the frequency of the energy on the secondary bus 54 can be reduced to the last described step and then to obtain even higher load speeds, the bus 54 can be short-circuited by a short circuiting switch 70 with resistance 21 inserted in the secondary circuit of the auxiliary motor 15. The rotor shaft 6 will then tend to run at the same speed as the frame 3, or 450 R. P. M. in the illustrated case. The synchronous motor 1 can now be taken out of service by opening the connecting switch 53 and the auxiliary induction motors can be also shut down without disturbing the load driving motors A, B, C at this speed. The latter motors will in this case run at their normal maximum speeds (synchronous speed minus slip) but will not be held in synchronous relation with each other.

The power factor of the energy supplied to this system can be adjusted by regulating the excitation of the synchronous motor 1 by means of the field rheostat 57.

Other combinations of motor speeds will produce different speed ranges and different speed increments. The preceding example was given by way of illustration.

Another method of operation consists of reversing the wound rotor motor 15 instead of the the multi-speed motor 30. For instance, by operating the latter motor at 1200, 900, and 600 direct connected to one of the rotatable members, and the former motor at plus or minus 450 R. P. M. or with the rotor held by the brake 35', with the multi-speed motor on the 1200 R. P. M. winding, relative speeds of the synchronous motor of 1200 plus 450 or 1650 R. P. M., 1200 minus 450 or 750 R. P. M., or 1200 plus 0 or 1200 R. P. M. can be obtained, corresponding to frequencies of 55, 25 and 40 cycles respectively, thereby controlling the load driving motors at 5/60, 35/60 or 20/60 of synchronous speed respectively. Hence, by adding and subtracting 450 R. P. M. from each of the speeds of the multi-speed motor, frequencies in increments of 5 cycles can be obtained in the armature of the synchronous machine from 15 to 55 cycles. As the method of control has been explained in detail hereinbefore, it will not be repeated for this example.

Instead of controlling wound rotor induction motors A, B, C by secondary frequency control, it is also possible to control motors by primary frequency control. In Figure 1 are shown three motors, D, E, F, in this case of the squirrel cage induction type, each having a primary winding connected to terminal leads 71 which can be connected to the adjustable frequency bus 54 by means of switches 72.

The method of control for this group of motors is similar to the examples given above except that the speeds of the motors D, E, F are directly proportional to the frequency of the energy on the bus 54, therefore a frequency of 10 cycles per second, instead of resulting in a speed of 50/60 of synchronous speed, operates these latter motors at substantially 10/60 of normal synchronous speed. The torque decreases at low frequencies, however, and the slip increases. In this case, although a group of motors can be controlled in unison, they will not operate in synchronism with each other unless they are synchronous motors instead of induction motors.

I do not intend to be limited to the details shown and described herein except as set forth in the following claims which I desire to protect by Letters Patent of the United States.

I claim:

1. A system of speed control comprising a load shaft, an alternating current motor connected thereto, said motor having a winding, the speed of said motor being controlled by control of the frequency of the energy in said winding, an adjustable frequency machine having an armature winding connected in series with said motor winding, and having a rotor member and a frame member, both of said members being mounted on bearings for independent rotation, and means for independently controlling the speed of each of said members to regulate the frequency in said armature winding, said last named means comprising an alternating current motor connected to each of said members and means for changing the speeds of said last named motors.

2. In combination, a plurality of alternating current motors for driving inter-related loads, each motor having a winding connected to a common bus, the speed of each motor being controlled by control of the frequency of the energy in said winding, an adjustable frequency machine having an armature winding connected to said bus, said adjustable frequency machine having a rotor member and a frame member, both of said members being adapted for independent rotation, and means comprising a variable speed alternating current motor coupled to each of said rotatable members respectively, for independently controlling the speeds of said members to regulate the frequency of the energy in said armature winding and hence in said motor windings.

3. In combination, a plurality of induction motors, each having a primary winding and a secondary winding, a source of alternating current energy connected to said primary windings, a common bus connected to each of said secondary windings, an adjustable frequency machine having an armature winding connected to said common bus, said adjustable frequency machine having a rotor member and a frame member, both of said members being adapted for independent rotation, means comprising a wound rotor induction motor for controlling the speed of one of said members, and means comprising a multi-speed squirrel cage induction motor for determining the speed of the other of said members.

4. In combination, an adjustable frequency machine having a rotatable frame member and a rotatable rotor member, and an armature winding, means comprising a multi-speed squirrel cage induction motor coupled to one of said members for operating said member at one of a plurality of predetermined speeds, and means comprising a wound rotor induction motor coupled to the other of said members for adjustably controlling its speed and hence the frequency of the energy in said armature winding.

5. A system of adjustable speed control for a plurality of inter-related load shafts, comprising a plurality of wound rotor induction motors connected to said load shafts respectively and having a common source of primary energy, said motors having secondary windings connected to a common bus, and means for controlling the speed of said motors while maintaining a synchronous relation between them, said means comprising an adjustable frequency machine having a rotatable frame member, a rotatable rotor member, and an armature winding connected to said common bus, a motor coupled to one of said members and adapted to operate at a normally constant speed, and a multi-speed induction motor coupled to the other of said rotatable members for driving said latter members at any one of a plurality of selectable speeds in either direction of rotation.

6. In a system comprising the combination of claim 5 wherein the normally constant speed motor, which is coupled to one of the rotatable members, is a wound rotor induction motor having a secondary winding, means for changing smoothly from one load speed to another, said means comprising a resistor and means for inserting the same in series with said secondary winding, whereby smooth changes in load speed are accomplished by inserting said resistor in said secondary winding, then reconnecting the multi-speed induction motor for a different speed, and then gradually short circuiting said resistor.

7. A system of adjustable speed control for a plurality of inter-related load shafts, comprising a plurality of wound rotor induction motors connected to said load shafts respectively and having a common source of primary energy, said motors having secondary windings connected to a common bus, means for controlling the speed of said motors while maintaining a synchronous relation between them, said means comprising an adjustable frequency machine having a rotatable frame member, a rotatable rotor member, and an armature winding connected to said common bus, means comprising a multi-speed induction motor coupled to one of said members for operating the same at one of a plurality of substantially constant speeds, and means comprising an induction motor coupled to the other of said members for operating the same at a number of speeds in either direction of rotation.

8. In combination, a load shaft, a motor coupled thereto, a winding in said motor, a synchronous machine having a rotatable armature member and a rotatable field member, an armature winding on said armature member, said armature winding being connected in series with said motor winding, an alternating current motor coupled to one of said rotatable members, switching means for changing the number of poles in said motor to give a plurality of substantially constant speeds, an induction motor coupled to the other of said members, said induction motor having a primary winding and a secondary winding and means comprising an adjustable resistance in series with said secondary winding, for adjusting its speed and for cushioning the surge of energy produced by a change in the number of poles in the first said rotatable member driving motor.

9. In combination, a load shaft, a motor coupled thereto, a winding in said motor, a synchronous machine having a rotatable armature member and a rotatable field member, a winding on said armature member, said armature winding being connected in series with said motor winding, variable speed motors for driving said rotatable members respectively to regulate the frequency in said series connected windings, and a brake for holding stationary at least one of said rotatable members.

10. A system of speed control comprising a load shaft, an alternating current motor connected thereto, said motor having a winding, the speed of said motor being controlled by control of the frequency of the energy in said winding, a synchronous machine having an armature winding connected in series with said motor winding, said synchronous machine having a rotor member and a frame member, both of said members being mounted on bearings for independent rotation, and means for independently adjusting the speeds of each of said members to regulate the frequency in said series connected windings.

11. In combination, a synchronous adjustable frequency machine having a rotatable frame member, a rotatable rotor member, and an armature winding disposed on one of said members, and means comprising a variable speed induction motor coupled to each of said members respectively for operating said members at a plurality of different speeds relative to each other, thereby adjustably controlling the frequency of the energy in said armature winding.

12. In combination, a main induction type machine having a primary winding and a secondary winding, a synchronous machine having a rotatable armature member and a rotatable field member, a winding on said armature member, said armature winding being connected in series with said secondary winding, a pair of induction motors, one of said motors coupled to each of said rotatable members respectively, and means for operating each of the last said induction motors at a plurality of speeds to regulate the frequency of the energy flowing between said series connected windings and hence to obtain a plurality of operating speeds of said main induction machine.

13. A system of speed control for an alternating current machine having a winding, the speed of said machine being controlled by control of the frequency of the energy in said winding, said system comprising in combination an adjustable frequency machine having an armature winding connected in series with the first said winding, said adjustable frequency machine having a rotor member and a frame member, both of said members being mounted on bearings for independent rotation, means for adjustably setting the speed of one of said members at any of a plurality of predetermined speeds, and means for adjusting the speed of the other of said members in either direction of rotation selectively, to regulate the frequency of the energy in said series connected windings.

14. In combination, an adjustable frequency machine having a rotatable frame member, a rotatable rotor member, and an armature winding disposed on one of said members, means for adjustably setting the speed of one of said members at any of a plurality of predetermined speeds, and means for adjusting the speed of the other of said members in either direction of rotation selectively, to regulate the frequency of the energy in said armature winding.

ALLEN M. ROSSMAN.